United States Patent
Thuilliez et al.

(10) Patent No.: US 11,498,985 B2
(45) Date of Patent: Nov. 15, 2022

(54) CONTINUOUS SYNTHESIS OF AN ETHYLENE AND BUTADIENE COPOLYMER

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Nuno Pacheco, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 450 days.

(21) Appl. No.: 16/606,371

(22) PCT Filed: Apr. 16, 2018

(86) PCT No.: PCT/FR2018/050946
§ 371 (c)(1),
(2) Date: Oct. 18, 2019

(87) PCT Pub. No.: WO2018/193193
PCT Pub. Date: Oct. 25, 2018

(65) Prior Publication Data
US 2022/0135717 A1    May 5, 2022

(30) Foreign Application Priority Data
Apr. 18, 2017 (FR) ..................... 1753358

(51) Int. Cl.
C08F 210/02    (2006.01)
C08F 2/06      (2006.01)

(52) U.S. Cl.
CPC ........ *C08F 210/02* (2013.01); *C08F 2800/10* (2013.01)

(58) Field of Classification Search
None
See application file for complete search history.

(56) References Cited

U.S. PATENT DOCUMENTS 3,901,862 A    8/1975  Cucinella et al.
6,569,799 B1   5/2003  Barbotin et al.
(Continued)

FOREIGN PATENT DOCUMENTS

EP    0526955 A1    2/1993
EP    1829901 A2    9/2007
(Continued)

OTHER PUBLICATIONS

Thuilliez "ansa-Bis (fluorenyl) neodymium Catalysts for Cyclopolymerization of Ethyline with Butadiene" Macromolecules, American Chemical Society, vol. 42., No. 1., Jun. 9, 2009, pp. 3774-3779.
(Continued)

*Primary Examiner* — Fred M Teskin
(74) *Attorney, Agent, or Firm* — Dickinson Wright PLLC

(57) ABSTRACT

A process for the synthesis of an ethylene/butadiene copolymer is provided. The process is continuous and comprises the following steps:
a. feeding at least one stirred polymerization reactor with a mixture of ethylene, butadiene, hydrocarbon-based solvent and catalytic system allowing the formation of cyclic trans-1,2-cyclohexane units in the polymer chain with a mole ratio of ethylene to the sum of the ethylene and butadiene monomers ranging from 0.5 to 0.99; the concentration of ethylene and butadiene monomers in the polymerization reaction medium being less than 15% by weight; the operating pressure of the reactor is greater than or equal to the saturated vapour pressure of the polymerization reaction medium; and the polymerization temperature is greater than 90° C.;
b. recovering the ethylene/butadiene copolymer, this copolymer comprising, statistically distributed, ethylene units, butadiene units and trans-1,2-cyclohexane
(Continued)

units, the molar fraction of ethylene units in the copolymer being greater than or equal to 50%.

18 Claims, 1 Drawing Sheet

(56) References Cited

U.S. PATENT DOCUMENTS

| | | | |
|---|---|---|---|
| 3,071,800 | A1 | 12/2011 | Thuilliez et al. |
| 9,266,978 | B2 * | 2/2016 | Kaita .................... C08F 210/02 |
| 2005/0239639 | A1 | 10/2005 | Monteil et al. |
| 2010/0022725 | A1 | 1/2010 | Thuilliez et al. |
| 2015/0315356 | A1 | 11/2015 | Schnell et al. |
| 2015/0353716 | A1 | 12/2015 | Thuilliez et al. |
| 2018/0371214 | A1 | 12/2018 | Thuilliez et al. |

FOREIGN PATENT DOCUMENTS

| | | | |
|---|---|---|---|
| EP | 1954705 | A2 | 8/2008 |
| FR | 1562573 | A1 | 6/2017 |
| WO | 2004035639 | A1 | 4/2004 |
| WO | 2007054224 | A2 | 5/2007 |
| WO | 2014082919 | A1 | 6/2014 |
| WO | 2014114607 | A1 | 7/2014 |

OTHER PUBLICATIONS

International Search Report for corresponding International Application No. PCT/FR2018/050946 dated Jul. 20, 2018.

* cited by examiner

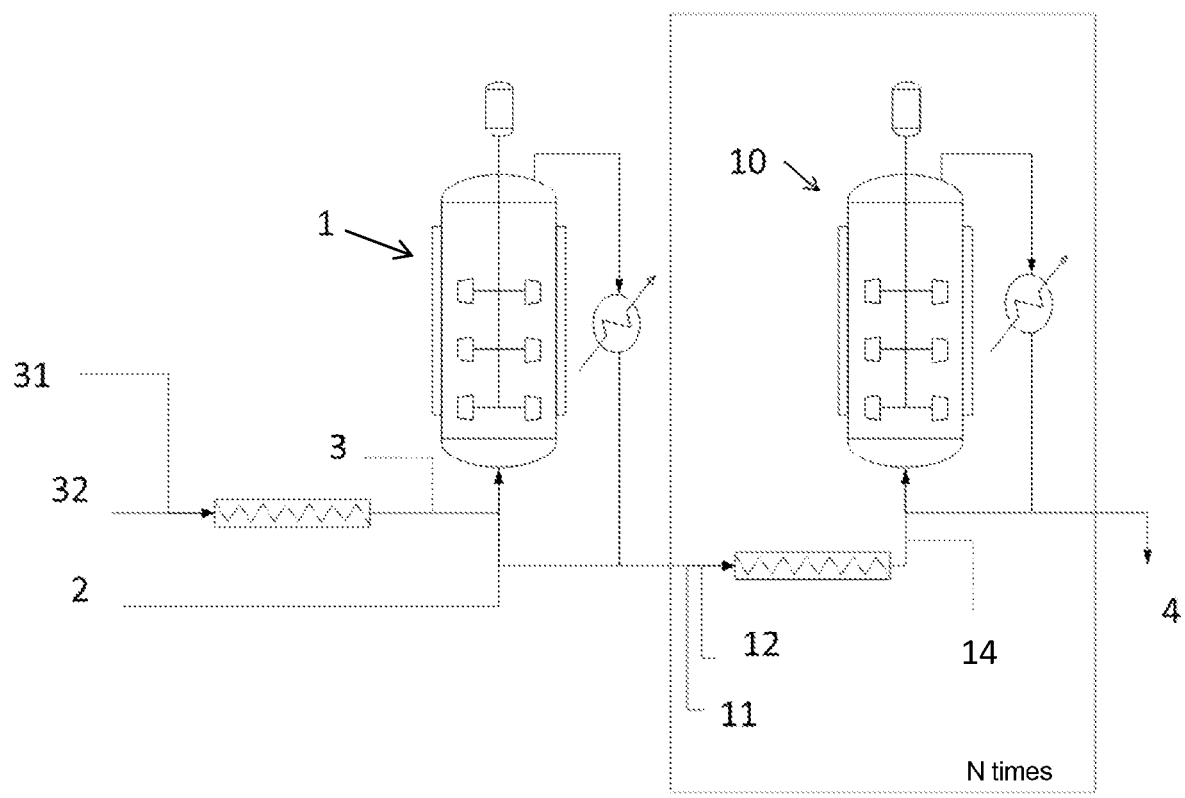

CONTINUOUS SYNTHESIS OF AN ETHYLENE AND BUTADIENE COPOLYMER

This application is a 371 national phase entry of PCT/FR2018/050946 filed on 16 Apr. 2018, which claims benefit of French Patent Application No. 1753358, filed 18 Apr. 2017, the entire contents of which are incorporated herein by reference for all purposes.

BACKGROUND

1. Technical Field

The present invention relates to a process for the continuous synthesis of ethylene/butadiene copolymers. The present invention also relates to a process for the continuous synthesis of copolymers for which the microstructure is controlled and homogeneous all along the chain of the copolymer.

2. Related Art

Copolymers based on ethylene and on conjugated diene have advantageous properties for a tyre application according to the characteristics of the intended materials, as described for example in patent applications WO 2014/082919 A1 or WO 2014/114607 A1.

Another advantage of these copolymers is the use of ethylene which is a common and commercially available monomer, which is accessible via the fossil or biological route.

Another advantage of these copolymers is the presence of ethylene units along the polymer backbone, which units are much less sensitive to oxidizing or thermal-oxidizing degradation mechanisms, which confers better stability and lifetime on the materials.

The synthesis of copolymers based on ethylene and butadiene is described for example in patents U.S. Pat. No. 3,901,862, EP 0 526 955 and WO 2004/035639. In application WO 2004/035639, the synthesis of copolymers based on ethylene and on conjugated diene makes it possible to obtain an ethylene-based elastomer with a low degree of crystallinity (less than 15%) despite the ethylene content greater than 70 mol %.

The invention relates particularly to the synthesis of copolymers based on ethylene and butadiene also comprising trans-1,2-cyclohexane units. Copolymers based on ethylene and butadiene comprising cyclohexane units are for example described in applications WO 2004/35639, EP 1 829 901 and WO 2004/035639. The copolymers obtained by means of the processes described in these applications exhibit not only an ethylene-unit and butadiene-unit concentration gradient, but also a trans-1,2-cyclohexane-unit concentration gradient.

In application FR 15/62573 (unpublished), it has been discovered that it is possible to control the degree of incorporation of ethylene and butadiene and the homogeneity of the various units all along the chain so as to obtain copolymers with a low degree of crystallinity. The synthesis processes described in this application are semi-continuous processes.

Such batchwise or semi-continuous polymerization processes are very flexible processes that are easy to adapt. In particular, this type of process is perfectly suitable for slow reactions as is the case for the copolymerization of ethylene and butadiene.

However, batchwise or semi-continuous polymerization processes have the drawback of being not very productive because of the shutdown times or dead times (loading times, discharge times, cleaning times), and more sensitive to variations compared with nominal working, and are therefore less robust in terms of product quality. Such processes are therefore less economical for large-scale industrial production for a tyre application.

However, continuous polymerization processes are not recommended for slow reaction systems such as that of the copolymerization of ethylene and butadiene, in particular according to the catalytic system which makes it possible to obtain trans-1,2-cyclohexane units, since, in this case, the residence time in the reactor or reactors is too high.

SUMMARY

The invention is directed towards a process of continuous synthesis of ethylene/butadiene copolymers also comprising trans-1,2-cyclohexane units, the molar fraction of trans-1,2-cyclohexane units advantageously being greater than or equal to 4%. The various units that can be found in these copolymers are ethylene units, butadiene units and trans-1,2-cyclohexane units.

A subject of the invention is a process for the synthesis of an ethylene/butadiene copolymer, wherein the process is continuous and comprises the following concomitant steps:

a. Feeding at least one stirred polymerization reactor with a mixture of ethylene, butadiene, hydrocarbon-based solvent and catalytic system allowing the formation of cyclic trans-1,2-cyclohexane units in the polymer chain with a mole ratio of ethylene to the sum of the ethylene and butadiene monomers, defined by $QnE/(QnE+QnB)$, with $QnE$ the molar flow rate of ethylene and $QnB$ the molar flow rate of butadiene, ranging from 0.5 to 0.99; the concentration of ethylene and butadiene monomers in the polymerization reaction medium being strictly less than 15% by weight relative to the total weight; the operating pressure of the reactor is greater than or equal to the saturated vapour pressure of the polymerization reaction medium; and the polymerization temperature is greater than 90° C.;

b. Recovering the ethylene/butadiene copolymer, this copolymer comprising, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units.

The concentration of ethylene and butadiene monomers in the polymerization reaction medium is advantageously strictly less than 10% by weight relative to the total weight.

Advantageously, the polymerization temperature is greater than 95° C., even more advantageously greater than 100° C.

The mole ratio of ethylene, $(QnE/(QnE+QnB))$, advantageously ranges from 0.70 to 0.99.

The ratio of flow rate by weight of monomers and of the mixture, defined by $(QmE+QmB)/(Qm\ total)$, with $QmE$ the flow rate by weight of ethylene, $QmB$ the flow rate by weight of butadiene and $Qm$ total the flow rate by weight of the mixture, is advantageously less than 0.15, preferably advantageously ranges between 0.005 and 0.15, even more advantageously between 0.05 and 0.15, said ratio of flow rate by weight of monomers and of the mixture advantageously being constant. When the flow rate by weight is lowered, the reaction temperature is increased in order to retain sufficient productivity for a continuous process. Advantageously, sufficient productivity for a continuous process in a productivity of 1000 g of polymer per g of metallocene of the catalytic system.

The residence time per polymerization reactor is advantageously less than 120 min, more advantageously the residence time is between 15 min and 40 min.

Advantageously, N reactors, where N ranges from 2 to less than 10, are mounted in series and
- The first reactor (reactor 1) is fed with ethylene, butadiene, solvent and catalytic system, while respecting the mole ratio of ethylene and the ratio of the flow rates by weight defined above, and the output thereof feeds the next reactor;
- The final reactor (reactor N) is fed from the reactor which precedes it (reactor N−1), and the output thereof feeds the polymer recovery step;
- Each reactor between the first and the last (when N is greater than 2) is fed by the output of the reactor which precedes it (reactor N−1) and the output thereof feeds the reactor which follows it (reactor N+1).

Each reactor, after the first, is advantageously also fed with a make-up stream of ethylene and butadiene so that the monomer concentration is identical at each reactor inlet.

In one variant, the polymerization reactor is a liquid single-phase reactor. The operating pressure of the reactor is advantageously at least 5 bar greater than the saturated vapour pressure of the mixture fed to the polymerization reactor.

In another variant, the polymerization reactor is a gas/liquid two-phase reactor. The operating pressure of the reactor is equal to the saturated vapour pressure of the mixture.

The hydrocarbon-based solvent is selected from $C_2$ to $C_{30}$ alkanes, branched $C_4$ to $C_{30}$ alkanes, cyclic $C_5$-$C_6$ alkanes, branched cyclic $C_6$-$C_{30}$ alkanes, $C_6$-$C_{30}$ aromatic solvents and mixtures of these products.

The catalytic system is advantageously as subsequently described.

Advantageously, the microstructure of the copolymer obtained by means of the process according to the invention is homogeneous and thus the molar concentration of each of the units is constant all along the copolymer chain.

Advantageously, in the copolymer obtained, the molar fraction of ethylene units ranges from 50 mol % to 95 mol %, relative to the total number of moles of ethylene, butadiene and trans-1,2-cyclohexane units.

Advantageously, in the copolymer obtained, the molar fraction of trans-1,2-cyclohexane units is greater than or equal to 4%, relative to the total number of moles of ethylene, butadiene and trans-1,2-cyclohexane units, more advantageously greater than or equal to 6%.

Advantageously, the copolymer obtained has a degree of crystallinity of less than 20%, advantageously less than 10%.

In the present description, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). Any range of values denoted by the expression "from a to less than b" means the range of values ranging from a to less than b (that is to say including the strict limit a and excluding the limit b).

For the purposes of the present invention, the term "ethylene unit" denotes the units of formula —($CH_2$—$CH_2$)—.

For the purposes of the present invention, the term "butadiene unit" denotes the 1,4-units of formula —($CH_2$—CH=CH—$CH_2$)— and the 1,2-units of formula —($CH_2$—C(CH=$CH_2$))—. The 1,4-units of formula —($CH_2$—CH=CH—$CH_2$)— may be in trans or cis configuration.

For the purposes of the present invention, the term "trans-1,2-cyclohexane unit" denotes the units of formula:

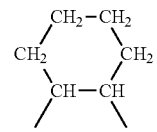

For the purposes of the present invention, in the expression "significantly free of composition gradient", the term "significantly" is intended to mean a variation of less than 2 mol %.

For the purposes of the present invention, in the expression "the concentration is identical or virtually identical to", the term "virtually identical" is intended to mean a variation of less than 2 mol %.

The flow rates by weight and molar flow rates correspond to the flow rates upstream of the reactor.

For the purposes of the present invention, the "polymerization reaction medium" or "reaction medium", which are two synonymous expressions, denotes the solution within the reactor and thus the solution in which the copolymer forms.

For the purposes of the present invention, the expression "constant temperature" is intended to mean a variation in temperature of less than 5° C. within the reactor.

For the purposes of the present invention, the expression "constant" pressure is intended to mean a variation in pressure of less than 0.5 bar.

For the purposes of the present invention, the expression "constant ethylene and butadiene concentrations" is intended to mean variations of less than 0.1 mol/l.

For the purposes of the present invention, the expression "monomers" denotes the ethylene and butadiene.

For the purposes of the present invention, the expression "monomer concentration" is intended to mean the concentration of ethylene and butadiene monomers in the reaction medium.

BRIEF DESCRIPTION OF THE DRAWINGS

FIG. 1: copolymerization process scheme.

DETAILED DESCRIPTION OF EXAMPLE EMBODIMENTS

A subject of the invention is a process for the synthesis of an ethylene/butadiene copolymer, wherein the process is continuous and comprises the following concomitant steps:
a. Feeding at least one stirred polymerization reactor with a mixture of ethylene, butadiene, hydrocarbon-based solvent and catalytic system allowing the formation of cyclic trans-1,2-cyclohexane units in the polymer chain with a mole ratio of ethylene to the sum of the ethylene and butadiene monomers, defined by QnE/(QnE+QnB), with QnE the molar flow rate of ethylene and QnB the molar flow rate of butadiene, ranging from 0.50 to 0.99; the concentration of ethylene and butadiene monomers in the polymerization reaction medium being strictly less than 15% by weight relative to the total weight; the operating pressure of the reactor is greater than or equal to the saturated vapour pressure of the polymerization reaction medium; the polymerization temperature is greater than 90° C.

b. Recovering the ethylene/butadiene copolymer, this copolymer comprising, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units.

Solvent

It is considered that the hydrocarbon-based solvent serves as a means of transporting the catalytic species and the copolymer formed.

Some examples that may be mentioned as hydrocarbon-based solvent include $C_2$ to $C_{30}$ alkanes, branched $C_4$ to $C_{30}$ alkanes, cyclic $C_5$-$C_6$ alkanes, branched cyclic $C_6$-$C_{30}$ alkanes, $C_6$-$C_{30}$ aromatic solvents and mixtures of these products.

Catalytic System

The copolymerization of ethylene and butadiene is advantageously catalysed by a catalytic system comprising at least one metallocene.

The catalytic system advantageously comprises at least two constituents, on the one hand a metallocene corresponding to formula (I):

[P(Cp¹)(Cp²)Met]　(I)

with:

Met being a group comprising:
at least one scandium or yttrium atom or one atom of lanthanide, the atomic number of which ranges from 57 to 71,
at least one monovalent ligand, belonging to the halogen group, such as chlorine, iodine, bromine or fluorine, or to the amide, alkyl or borohydride group,
optionally other constituents, such as complexing molecules, belonging to the ether or amine group, P being a group, based on at least one silicon or carbon atom, bridging the two groups Cp¹ and Cp²

Cp¹ and Cp² are identical to or different from one another,
when Cp¹ and Cp² are identical to one another, they are selected from indenyls substituted in the 2 position, such as 2-methylindene or 2-phenylindene, or from substituted or unsubstituted fluorenyls, such as fluorenyl, 2,7-di-tert-butylfluorenyl or 3,6-di-tert-butylfluorenyl,
when Cp¹ and Cp² are different from one another, Cp¹ is selected from substituted or unsubstituted fluorenyls, such as fluorenyl, 2,7-di-tert-butylfluorenyl, or 3,6-di-tert-butylfluorenyl, and Cp² is selected from cyclopentadienyls substituted in the 2 and 5 positions, such as tetramethylcyclopentadiene, from indenyls substituted in the 2 position, such as 2-methylindene or 2-phenylindene, or from substituted fluorenyls, such as 2,7-di-tert-butylfluorenyl or 3,6-di-tert-butylfluorenyl;

on the other hand, a co-catalyst which is an alkyl magnesium, an alkyl lithium, an alkyl aluminium, a Grignard reagent or a mixture of these constituents.

By way of substituted cyclopentadienyl, fluorenyl and indenyl groups, mention may be made of those which are substituted with alkyl radicals having 1 to 6 carbon atoms or with aryl radicals having 6 to 12 carbon atoms. The choice of the radicals is also guided by the accessibility to the corresponding molecules, which are the substituted cyclopentadienes, fluorenes and indenes, because the latter are commercially available or can be easily synthesized.

In the present patent application, in the case of the cyclopentadienyl group, the 2 (or 5) position denotes the position of the carbon atom which is adjacent to the carbon atom to which the bridging group P is attached, as is represented in the diagram below.

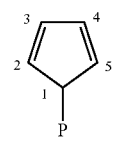

Mention may more particularly be made, as cyclopentadienyl group substituted in the 2 and 5 positions, of the tetramethylcyclopentadienyl group.

In the case of the indenyl group, the 2 position denotes the position of the carbon atom which is adjacent to the carbon atom to which the bridging group P is attached, as is represented in the diagram below.

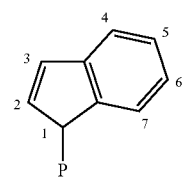

Mention may more particularly be made, as indenyl groups substituted in the 2 position, of 2-methylindenyl or 2-phenylindenyl.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as represented in the scheme below, the 9 position corresponding to the carbon atom to which the bridging group P is attached.

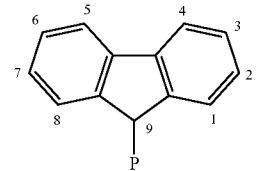

Advantageously, the metallocene is a lanthanide metallocene. Preferentially, the lanthanide metallocene is selected from the compounds [Me₂Si(Flu)₂Nd(BH₄)₂Li(THF)], [Me₂Si(Flu)₂Nd(BH₄)(THF)], [Me₂Si(2-MeInd)₂Nd(BH₄)], [Me₂Si(C₅Me₄)(Flu)Nd(BH₄)], [Me₂Si(2-MeInd)(Flu)Nd(BH₄)] and the co-catalyst is selected from dialkyl magnesium compounds such as ethyl butyl magnesium or butyl octyl magnesium.

The symbol "Flu" represents the fluorenyl group in $C_{13}H_8$ and the symbol "MeInd" represents an indenyl group substituted in the 2 position with a methyl.

Such systems have for example been described in applications WO 2004/035639 and WO 2007/054224.

The preparation of the catalytic system solution is a difficult step since this type of catalytic system does not withstand the presence of air or of protic products, such as water or alcohols. The preparation is carried out with the polymerization solvent that has been purified and/or recycled from the process.

Optionally, the catalytic system can comprise other constituents, selected from ethers, aliphatic solvents, or other compounds known to those skilled in the art and compatible with such catalytic systems.

Polymerization Process

The complete continuous solution polymerization process generally comprises three major steps:
Step 1: preparation step
Step 2: polymerization step
Step 3: polymer recovery step.

Step 1: Preparation Step

The objective of step 1 is to:
Purify the (ethylene and butadiene) monomers and the solvent if necessary
Prepare the catalytic system solution.

The monomers, that is to say the ethylene and butadiene, and the solvent to be purified originate from the external feed of the process and advantageously recycled from step 3. The techniques for purifying the monomers and solvent depend on the nature of the impurities and the content thereof. By way of non-limiting example, it may be mentioned that distillation or chemical adsorption techniques can be envisaged for purifying the monomers or solvent.

These components are then continuously loaded into the polymerization reactor(s).

Step 2: Polymerization Step

Feed:

The stirred reactor is continuously fed with solvent, catalytic system, ethylene and butadiene. In order to avoid any early copolymerization, the catalytic system is advantageously continuously introduced into the polymerization reactor by a stream other than that of the monomers.

Advantageously, the reactor is fed, on the one hand, with solvent comprising butadiene and saturated with ethylene, and, on the other hand, with solvent comprising the catalytic system. In the two cases, the solvent used is advantageously identical. In any event, the solvents used must subsequently be miscible in the reaction medium.

On entering, the mole ratio of ethylene to the monomers is specified by those skilled in the art so as to achieve the desired composition of the copolymer. The mole ratio of ethylene defined by QnE/(QnE+QnB) with QnE=molar flow rate of ethylene and QnB=molar flow rate of butadiene, ranges from 0.50 to 0.99, advantageously from 0.70 to 0.99, more advantageously from 0.70 to 0.95.

Advantageously, the mole ratio of ethylene to the monomers (QnE/(QnE+QnB)) is kept constant.

When the process uses several polymerization reactors in series, the reactor(s) downstream of the first reactor are fed with the output of the preceding reactor. In addition, a supplementary feed of monomers can be provided for so that the mole ratio of ethylene to the monomers is identical at each reactor inlet.

When the process uses several polymerization reactors in parallel, the mole ratio of ethylene to the monomers is advantageously identical for each reactor.

The ratio of flow rates by weight of monomers (ethylene and butadiene) with the flow rate by weight of solution (monomers, solvent and catalytic system) imposes a saturation pressure value which itself has an impact on the microstructure. This ratio of flow rates by weight is also specified beforehand by those skilled in the art. The saturation pressure can be calculated beforehand by those skilled in the art as a function of the reactor temperature and the composition of the reactor feed. The ratio of flow rate by weight, defined by (QmE+QmB)/(Qmtotal) with QmE=flow rate by weight of ethylene, QmB=flow rate by weight of butadiene and Qmtotal=flow rate by weight of the solution, advantageously ranges between 0.05 and 0.15 (weight/weight).

Advantageously, the monomer concentration in the feed stream is kept constant.

When the process uses several polymerization reactors in series, the reactor(s) downstream of the first reactor are fed with the output of the preceding reactor. In addition, a supplementary feed of monomers, and where appropriate of solvent, can be provided for so that the ratio of flow rates by weight (QmE+QmB)/(Qmtotal), and thus the monomer concentration, is identical at each reactor inlet. Thus, at the inlet of each reactor, the monomer concentration is advantageously identical and constant.

When the process uses several polymerization reactors in parallel, the ratio of flow rates by weight (QmE+QmB)/(Qmtotal) is advantageously identical for each reactor.

Advantageously, over time, the mole ratio of ethylene to the monomers and the monomer concentration are constant. A constant mole ratio of ethylene to the monomers and a constant monomer concentration make it possible to obtain ethylene/butadiene copolymers for which the microstructure is controlled and homogeneous all along the length of the copolymer chain.

Polymerization Conditions

A polymerization temperature greater than 90° C. makes it possible to increase the copolymerization rate and thus allows a gain in productivity required for the copolymerization to be compatible with a continuous polymerization process.

It will be recalled that, in a stirred and continuous reactor, the concentration in the reaction medium corresponds to the concentration at the reactor outlet.

The total weight is the weight of the reaction medium, that is to say in particular the solvent, the monomers, the catalytic system and the polymer formed.

The mean residence time in the reactor makes it possible to define the liquid flow rate of the feed solution for a given reaction volume. The mean residence time is advantageously between 10 and 100 minutes, more advantageously between 15 and 40 minutes. The mean residence time is calculated by the volume ratio of the reaction medium in the reactor and the feed flow rate by volume.

The operating pressure of the reactor is advantageously between 1 bar and 200 bar, more advantageously between 1 bar and 100 bar. In certain embodiments, the operating pressure of the reactor is between 1 bar and 50 bar. The pressure is such that it allows the presence of at least one liquid phase in the reactor.

The operating pressure of the reactor is advantageously kept constant. Any means known to those skilled in the art can be used for this purpose.

In one embodiment, the reactor comprises a single liquid phase. In another embodiment, the reactor comprises a liquid phase and a gas phase. Depending on the presence or absence of gas phase, as explained below, the operating pressure of the reactor is greater than or equal to the saturated vapour pressure at the temperature defined for the polymerization.

According to the invention, the composition of the monomers in the reaction medium is limited by the liquid-vapour equilibrium. Thus, for a composition of monomers in a solvent and a desired reactor temperature, those skilled in the art can estimate the saturated vapour pressure of the reaction medium. In the case of a liquid single-phase reactor, the reactor pressure must be greater than the saturated vapour pressure in order to guarantee that the reaction mixture remains totally liquid. In the case of a gas/liquid two-phase reactor, the reactor pressure must be equal to the saturated vapour pressure of the reaction mixture in order to guarantee the presence of gas.

The saturated vapour pressure can be calculated by any means known to those skilled in the art, such as, for example, using the Peng-Robinson thermodynamic model.

The polymerization temperature is greater than 90° C. The polymerization temperature is of course less than the copolymer decomposition temperature. The polymerization temperature is advantageously between 90° C. and 200° C.

The polymerization temperature is advantageously kept constant. Any means known to those skilled in the art can be used for this purpose. By way of example, mention may be made of the heat exchanger inside the reactor, or outside, by control of the feed temperature.

An increase in the temperature makes it possible to increase the polymerization rate and thus to allow a gain in productivity. It also promotes side reactions, in particular the β-H elimination reaction. The consequence of this reaction is the broadening of the molecular weight distribution (that is to say an increase in the polydispersity index). It thus makes it possible to obtain copolymers with a broad molecular weight distribution.

Polymerization Reactors

The reactors are advantageously fitted with stirring means. This is because sufficient stirring makes it possible to guarantee a good level of mixing and thus to avoid reaction medium dead or segregation zones.

It is preferable to use reactors which make it possible to hold and control at least 15 bar of pressure, preferentially at least 200 bar of pressure.

It is also preferable to use reactors with an efficient temperature control device; for example, a jacket, an internal condenser in the gas phase, a heat exchanger in the liquid phase, a cooler in the external gas recirculation loop.

One or more reactors, in series or in parallel, can be used.

In one operating mode, at least 2 stirred reactors are connected in series. The number of reactors in series may be greater than 2 and preferentially less than 10 reactors in series, preferentially less than 5 reactors.

A series of N reactors, where N ranges from 2 to less than 10, is intended to mean that:

The first reactor (reactor 1) is fed with monomers (ethylene, butadiene), solvent and catalytic system, while respecting the mole ratio of ethylene and the ratio of flow rates by weight defined above, and the output thereof feeds the next reactor;

The final reactor (reactor N) is fed from the reactor which precedes it (reactor N−1), and the output thereof feeds the polymer recovery step subsequently described;

Each reactor between the first and the last (when N is greater than 2) is fed by the output of the reactor which precedes it (reactor N−1) and the output thereof feeds the reactor which follows it (reactor N+1).

In each reactor, the concentration of ethylene and butadiene monomers in the polymerization reaction medium is strictly less than 15% by weight relative to the total weight, advantageously strictly less than 10% by weight. Advantageously, a make-up of monomers, and where appropriate of solvent, can be carried out in the feed of the reactors which follow the first, so that the composition of monomers in the feed of each reactor after the first reactor is equal to the composition of monomers of the first reactor.

Advantageously, the mole ratio of ethylene to monomers and the ratio of flow rates by weight of monomers are as defined above and are constant from one reactor to the other.

The operating conditions of each reactor are identical to those described above, for the polymerization.

According to a first variant of the invention, the polymerization reactor is a liquid single-phase reactor; that is to say a reactor filled with the polymerization solution, without gas phase.

In this variant, the operating pressure of the reactor is greater than the saturated vapour pressure of the reaction medium at the temperature defined for the polymerization. Preferentially, the monomer injection flow rate and the reactor outlet flow rate are controlled such that the operating pressure is at least 5 bar greater than the saturated vapour pressure at the temperature defined for the polymerization. The pressure of the reactor can also be managed by any conventional means known to those skilled in the art; by way of example, an outlet valve which generates sufficient pressure drop for the pressure of the reactor to remain at the desired level.

According to the temperature and pressure conditions selected by those skilled in the art, the reaction medium is liquid and/or supercritical. It is considered that these two states correspond to a liquid single-phase reactor.

In this variant, one or more liquid single-phase reactors, in series or in parallel, can be used.

For a liquid single-phase reactor, those skilled in the art can determine the monomer conversion by the following equation:

$$\% \; Conv = \frac{[M]_0 - [M]}{[M]_0} = Act([M], T) \frac{[C]_0}{[M]_0} mrt; \qquad \text{Equation 1}$$

Where:
% Conv is the percentage conversion of the monomers;
$[M]_0$ is the composition of monomers in the feed of the reactor;
$[M]$ is the composition of monomers in the reactor and at the outlet of the reactor:
Act([M],T), in kg/(h·mol), is the catalytic activity measured as in the experimental examples, where:
T is the reaction temperature;

$$\frac{[C]_0}{[M]_0},$$

in mol/kg, is the ratio between the amount of catalyst and the amount of monomers in the feed of the reactor;
mrt, in h, is the mean residence time in the reactor. The mean residence time is calculated by the ratio of the volume of the reactor to the feed flow rate by volume.

According to a second variant of the invention, the polymerization reactor is a gas/liquid two-phase reactor; that is to say a reactor comprising the polymerization solution, which constitutes the liquid phase, and a gas phase.

In this variant, the operating pressure of the reactor is equal to the saturated vapour pressure of the reaction medium at the temperature defined for the polymerization. Thus, the monomer injection flow rate and the reactor outlet flow rate are controlled such that the operating pressure is equal to the saturated vapour pressure at the temperature defined for the polymerization. The pressure of the reactor can also be managed by any conventional means known to those skilled in the art; by way of example, an outlet valve which generates sufficient pressure drop for the pressure of the reactor to remain at the desired level.

According to the temperature and pressure conditions selected by those skilled in the art, the reaction medium is liquid and/or supercritical. It is considered that these two states correspond to a gas/liquid two-phase reactor.

In this variant, one or more gas/liquid two-phase reactors, in series or in parallel, can be used.

Advantageously, this operating mode in the presence of a gas phase makes it possible to:
promote heat exchanges if the reactor is equipped with an internal or external condenser;
increase the local concentration of monomers in the reaction medium compared with a reactor full of liquid and thus to increase the productivity.

The gas phase may comprise an inert gas, such as nitrogen. For a gas/liquid two-phase reactor, those skilled in the art can determine the monomer conversion by the same equation as for a liquid single-phase reactor, with the exception that the calculation of the mean residence time (mrt) is determined by the ratio of the volume of liquid reaction medium to the feed flow rate by volume.

With regard to the sequence of liquid single-phase and/or gas/liquid two-phase reactors, those skilled in the art know how to use the above equation to calculate the conversion in processes of this type.

Discharge of the Reactor

By definition, a continuous reactor has at least one inlet and at least one outlet which are systematically open. As known to those skilled in the art, the outlet of the reactor must be sufficiently far from the inlet to avoid preferential-path problems. Ideally, the inlet and outlet of the reactor are the maximum distance apart.

In the case of a two-phase reactor, the outlet is of course placed in contact with the liquid phase.

The effluent of the stirred reactor is sent to the polymer recovery step.

The process according to the invention also has the advantage of having a simple feed system making it possible to improve the control of the composition of the reaction medium, as opposed to the complex feed system of the semi-continuous reactor for managing the composition of the reaction medium described in patent application FR15/62573 (unpublished).

The process according to the invention also has the advantage of being sufficiently productive to be used at the industrial level.

It is considered that a continuous process is productive when the amount of polymer formed, by weight, per gram of metallocene of the catalytic system is at least 1000 g/g.

The productivity parameter can be combined with the conversion equation, as explained below:

$$Prod = \frac{m_{EBR}}{m_{metallocene}} = \frac{\% \, Conv}{\frac{[C]_0}{[M]_0} mw(C)} = \frac{Act([M], T)mrt}{mw(C)};$$

Where:
$m_{EBR}$ is the mass of polymer formed in a reactor or reactor sequence;

$m_{metallocene}$ is the mass of metallocene of the catalyst used to produce the $m_{EBR}$ in a reactor or reactor sequence;
mw(C) is the molecular weight of the metallocene of the catalyst.

A scheme of the copolymerization process is represented in FIG. 1.

The stirred reactor 1 is continuously fed with a solution 2 comprising the solvent and the catalytic system and with a solution 3 comprising the solvent saturated with ethylene and the butadiene. This solution 3 is obtained by mixing the ethylene 31 and a solution 32 comprising the solvent, the butadiene and the monomers (ethylene, butadiene) recycled from step three (recovery of the polymer).

The output of the reactor 1 feeds a second reactor 10. An additional feed of ethylene 11 and of butadiene+solvent 12 can be provided for. In this case, the feeds are homogenized so as to introduce into the reactor a solution 14 comprising the solvent saturated with ethylene. Several reactors in series may be provided for. At the outlet of the final reactor, a solution 4 comprising the copolymer is recovered.

In each reactor, the polymerization conditions, in particular the monomer concentrations in the reaction medium, pressure and temperature, are advantageously identical so as to produce a copolymer of homogeneous microstructure, thus making it possible to obtain a copolymer having low degrees of crystallinity even though the molar concentration of ethylene units is very high.

Step 3: Step of Recovering the Copolymer

Step 3) consists in:
recovering the copolymer from the solution and separating it from its solvent according to any method known to those skilled in the art, so as to isolate and to bring it to a volatile substance content of less than 1% by weight,
recovering the solvent and the unconverted monomers and recycling them completely or partly to step 1) if purification is required, or completely or partly to step 2) if purification is not required.

For this, mention may be made, in a non-limiting manner, of several recovery techniques known to those skilled in the art, such as:
Separation by settling out, if two liquid phases can form under the separation conditions. One of the phases is rich in polymer, the other rich in solvent and in unreacted monomers. This technique may be possible if the mixture of solvent, monomers and polymer allows it, and advantageous from an energy point of view. This technique is often present after step 2);
Flash, which consists in separating, by devolatilization, the solvent and the unconverted monomers from the polymer by a thermal effect or by the effect of a pressure reduction, or both. This technique is often present after step 2) or the separating by settling out;
Stripping, which consists in separating the solvent and the unconverted monomers from the polymer through the presence of a third inert substance such as nitrogen or steam. This step can be coupled with a thermal effect in order to improve the recovery of the polymer. This technique is often present after the flash devolatilization;
Press-drying, which consists in pressing elastomer particles in order to extract the liquid constituents contained inside the elastomer particles. This technique is often present after a stripping step;
Extrusion/flash, which consists in compressing the polymer at high pressures and at sufficiently high temperatures to subsequently perform an expansion by flash.

This makes it possible to devolatilize virtually all of the solvent residues and unconverted monomer residues. This technique is often present after a press-drying step or the flash step;

Drying with a fluid, preferably hot fluid, which makes it possible to remove the solvent residues and unconverted monomer residues in the polymer. This technique is often present after a press-drying step or the flash step.

In one preferential mode of operation, the recovery of the polymer from the polymer solution is carried out by:

1 Concentration in a succession of flash steps in order to obtain a polymer solution concentrated to at least 15% by weight, preferentially to at least 20% by weight, and an impurity-free solvent and unconverted-monomer gas stream. This stream can be recycled to step 2).

2 Steam-stripping in order to obtain the polymer with a hydrocarbon (solvents and unconverted monomers) content of less than 5% by weight, preferentially less than 1% by weight. The gas stream rich in solvent, in unconverted monomers and in steam is sent to step 1) in order to be purified by separation by settling out, distillation and/or chemical adsorption. The polymer flow after this step is composed of water and polymer particles saturated with water and less than 1% by weight of hydrocarbons.

3 Filtration of the polymer particles and then press-drying in order to reduce the volatile substance (hydrocarbons and water) content to less than 5% by weight, preferably to less than 3% by weight of volatile substances.

4 Compression at more than 50 bar, heating at less than 250° C., extrusion and flash at atmospheric pressure in order to reduce the volatile substance content to less than 1% by weight.

5 Drying in hot dry air (~80° C.) in order to achieve the specification in terms of volatile substance content, usually less than 0.5% by weight.

Copolymer Obtained:

The process thus allows the synthesis of ethylene/butadiene copolymer, this copolymer comprising, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units. In the copolymer obtained by means of the process according to the invention, the molar fraction of ethylene units, relative to the total number of moles of ethylene, butadiene and trans-1,2-cyclohexane units, is advantageously within from 50 mol % to 99 mol %, more advantageously from 70 mol % to 99 mol %, even more advantageously from 70 mol % to 95 mol %, relative to the total number of moles of ethylene, butadiene and trans-1,2-cyclohexane units.

According to one particularly advantageous example of implementation of the invention, in the ethylene/butadiene copolymer, the molar fraction of butadiene units, relative to the total number of moles of ethylene, butadiene and trans-1,2-cyclohexane units, in said copolymer, is less than 50 mol %. The molar fraction of butadiene units advantageously ranges from 1 to 30 mol %, relative to the total number of moles of ethylene, butadiene and trans-1,2-cyclohexane units. The butadiene units denote the 1,4-units of formula —($CH_2$—CH=CH—$CH_2$)—, of trans or cis configuration, and the 1,2-units of formula —($CH_2$—C(CH=$CH_2$))—.

Preferably, the copolymers according to the invention are such that they comprise trans-1,2-cyclohexane units, originating from an insertion of butadiene and of ethylene, according to a molar fraction greater than 4% and, even more preferentially, greater than or equal to 6%, relative to the total number of moles of ethylene, butadiene and trans-1,2-cyclohexane units.

In the ethylene/butadiene copolymer, the molar fraction of the trans-1,2-cyclohexane units is advantageously greater than 4% and less than or equal to 12%, more advantageously greater than 4% and less than or equal to 10%, relative to the total number of moles of ethylene, butadiene and trans-1,2,-cyclohexane units. Preferably, the molar fraction of the trans-1,2-cyclohexane units is greater than 6% and less than or equal to 12%, advantageously greater than 6% and less than or equal to 10%, relative to the total number of moles of ethylene, butadiene and trans-1,2-cyclohexane units.

It will be possible to determine the concentration of each of the units in advance according to the nature of the catalytic system selected and the operating conditions (mole ratio and ratio of the flow rates by weight defined above).

Advantageously, the concentration of ethylene units, of butadiene units and of trans-1,2-cyclohexane units is identical or virtually identical all along the chain of the copolymer. The copolymer obtained by means of the process according to the invention is thus advantageously of homogeneous microstructure.

A copolymer is of homogeneous microstructure when, for each of these units, at each instant of polymerization, the concentrations in the chain are identical or virtually identical. Thus, for each of these units, at a given instant, the concentration is identical or virtually identical to its concentration at the instant just before and after, and thus at any instant of the copolymerization. In particular, in the ethylene/butadiene copolymer, the molar concentration of each of these units is constant all along the chain of the copolymer. Thus, for a representative number of successive units defining a segment, present at the beginning, middle or end or at any other place of the chain of the copolymer, the concentration of ethylene units, butadiene units and trans-1,2-cyclohexane units is identical or virtually identical in each segment. A sequence of 10 units may be a representative number. Thus, no over-concentration of one of these units is observed, in particular at the chain beginning or chain end. In other words, the microstructure is free or significantly free of composition gradient.

Surprisingly, and highly advantageously, the control of the microstructure of the copolymer makes it possible to obtain copolymers having low degrees of crystallinity even though the molar concentration of ethylene units is very high. Thus, it is possible to obtain copolymers comprising high contents of ethylene units and having a limited degree of crystallinity. Advantageously, the ethylene/butadiene copolymer obtained by means of the process according to the invention has a degree of crystallinity of less than 25%, more advantageously less than 20%, even more advantageously less than 15%, even more advantageously less than 10%.

Advantageously, the ethylene/butadiene copolymers according to the invention have a weight Mn ranging from 1000 g/mol to 1 500 000 g/mol, more preferentially ranging from 60 000 g/mol to 250 000 g/mol.

According to another characteristic of the invention, the copolymers according to the invention have a polydispersity index (PDI) which is greater than 1.5. Preferably, the index PDI of said copolymers is greater than or equal to 3. Like the molecular weights Mn, the polydispersity indices PDI have been determined in the present application by size exclusion chromatography (SEC technique described before the examples).

The copolymers according to the invention preferably have a glass transition temperature Tg which is less than 25° C. More specifically, these copolymers can for example have a temperature Tg of between −45° C. and −20° C.

The copolymers obtained by means of the process according to the invention are advantageously elastomers.

The abovementioned characteristics of the present invention, and also others, will be better understood on reading the following description of several exemplary embodiments of the invention, given by way of illustration and without limitation, in relation to the appendices.

Measurements and Tests Used

DETERMINATION OF THE MOLAR MASSES: Size Exclusion Chromatography analysis of the copolymers:

a) For the copolymers which are soluble in tetrahydrofuran (THF) at ambient temperature, the molar masses were determined by size exclusion chromatography in THF. The samples were injected using a Waters 717 injector and a Waters 515 HPLC pump at a flow rate of 1 ml·min$^{-1}$ in a series of Polymer Laboratories columns.

This series of columns, placed in a thermostated chamber at 45° C., is composed of:
1 PL Gel 5 μm precolumn,
2 PL Gel 5 μm Mixte C columns,
1 PL Gel 5 μm-500 Å column.

The detection was carried out using a Waters 410 refractometer.

The molar masses were determined by universal calibration using polystyrene standards certified by Polymer Laboratories and a double detection with refractometer and coupling to the viscometer.

Without being an absolute method, SEC makes it possible to comprehend the distribution of the molecular weights of a polymer. On the basis of standard commercial products of polystyrene type, the various number-average weights (Mn) and weight-average weights (Mw) can be determined and the polydispersity index calculated (PDI=Mw/Mn).

b) For the copolymers which are insoluble in tetrahydrofuran at ambient temperature, the molar masses were determined in 1,2,4-trichlorobenzene. They were first dissolved under hot conditions (4 h 00 at 150° C.), then they were injected at 150° C., with a flow rate of 1 ml·min$^{-1}$, into a Waters Alliance GPCV 2000 chromatograph equipped with three Styragel columns (2 HT6E columns and 1 HT2 column).

The detection was carried out using a Waters refractometer.

The molar masses were determined by relative calibration using polystyrene standards certified by Polymer Laboratories.

Determination of the Molar Fractions

Reference will be made to the article "Investigation of ethylene/butadiene copolymers microstructure by $^1$H and $^{13}$C NMR, Llauro M. F., Monnet C., Barbotin F., Monteil V., Spitz R., Boisson C., Macromolecules 2001, 34, 6304-6311", for a detailed description of the $^1$H NMR and $^{13}$C NMR techniques which were precisely used in the present application to determine the molar fractions of these trans-1,2 cyclohexane units, and also the ethylene, 1,4-cis butadiene and 1,4-trans butadiene units.

Determination of the Crystallinity

The degree of crystallinity measurement is carried out by comparison of the enthalpy of fusion observed in the case of EBRs. This endothermic phenomenon is observed during the analysis of the thermogram of the DSC (Differential Scanning Calorimetry) measurement. The measurement is carried out by back-and-forth scanning from −150° C. to 200° C. under an inert (helium) atmosphere with a gradient of 20° C./min.

The signal corresponding to the endothermic (fusion) phenomenon is integrated and the degree of crystallinity is the ratio of the enthalpy measured to that of perfectly crystalline polyethylene (290 J/g).

% Crystallinity=(Enthalpy measured in J/g)/(theoretical enthalpy of a 100% crystalline polyethylene in J/g)

Determination of the Glass Transition Temperature

The glass transition temperature, Tg, is measured in the present application by the DSC (Differential Scanning Calorimetry) technique on a Setaram DSC 131 apparatus. The temperature programme used corresponds to a temperature increase from −120° C. to 150° C. at a rate of 10° C./min. Reference may be made to the method described in application WO 2007/054224 (page 11).

EXAMPLES

The series of examples below is intended to illustrate a few embodiments of the invention.

Example 1: Effect of the Temperature

In this example, the effect of the temperature on the catalytic activity and consequently on the estimated productivity for a continuous process is evaluated.

The productivity is expressed in gram of copolymer per gram of metallocene of the catalytic system.

The polymerization tests were carried out under the following conditions:
  Batch reactor of working volume: 5l, fed with butadiene and ethylene with QnE, QnB, QmE and QmB constant; QnE/(QnE+QnB)=81%
  Solvent: 1.5 kg of methyl cyclohexane
  Catalytic system: 1.4×10−4 mol of metallocene and 3.1×10$^{-4}$ mol of co-catalyst
  Residence time: 40 min (for the estimation of the productivity of the continuous process)
  % M=Monomer concentration defined by weight amount of butadiene and ethylene in the total reaction medium The results are given in the table below:

TABLE 1

| % M | T (° C.) | Activity (kg/h · mol) | Productivity (g/g) |
|---|---|---|---|
| 4 | 80 | 452 | 471 |
| 5 | 80 | 516 | 538 |
| 7 | 80 | 564 | 588 |
| 6 | 80 | 617 | 644 |
| 6 | 100 | 1235 | 1287 |
| 5 | 120 | 1678 | 1750 |

It is noted that the catalytic activity, and thus the productivity, increases with the temperature. Above 100° C., a productivity greater than 1000 g/g is obtained for a monomer concentration of less than 10%.

Example 2: Effect of the Temperature on the PDI as a Function of the Monomer Concentration in the Reaction Medium In this example, the effect of the intended polymerization temperature on the polydispersity index of the copolymer obtained is evaluated for various conversions.

The polymerization tests of the table above were carried out under the following conditions:
  Batch reactor of working volume: 5l, fed with butadiene and ethylene with QnE, QnB, QmE and QmB constant; QnE/(QnE+QnB)=81%
  Solvent: 1.5 kg of methyl cyclohexane
  Catalytic system: $1.4 \times 10^{-4}$ mol of metallocene and $3.1 \times 10^{-4}$ mol of co-catalyst
  Residence time: greater than 20 min (parameter of little importance for the PDI measurement)
  % M=Monomer concentration defined by weight amount of butadiene and ethylene in the total reaction medium
The results are reported in the tables below:

TABLE 2

| Intended polymerization temperature (° C.) | % M | PDI |
|---|---|---|
| Outside the invention | | |
| 80 | 4% | 1.45 |
| 80 | 3% | 1.41 |
| 80 | 4% | 1.51 |
| 80 | 5% | 1.35 |
| 70 | 6% | 1.46 |
| 80 | 6% | 1.51 |
| According to the invention | | |
| 100 | 6% | 1.96 |
| 120 | 5% | 1.96 |

For monomer concentrations in the reaction medium of less than 15% by weight and above 90° C., the β-H elimination reactions increase and thus make it possible to obtain a high polydispersity index.

Example 3: Copolymer Microstructure—Continuous Process Versus Semi-Continuous Process In patent application FR15/62573 (unpublished), the semi-continuous process at constant temperature and at constant ethylene pressure and constant butadiene pressure results in the obtaining of a homogeneous distribution of the various constituent units of ethylene/butadiene copolymers.

In the data which follow, it is shown that the continuous process results in the same copolymers as those which are accessible with the semi-continuous process of patent application FR15/62573 (unpublished).

The conditions for polymerization of the ethylene and butadiene according to the invention suppose that the concentration of each of the two monomers in the reaction medium remains constant. This is the case with the semi-continuous process of patent application FR15/62573 and of the present invention.

For any reaction of order greater than or equal to 1 with respect to the monomers, those skilled in the art deduce, in a trivial manner, that the rates of insertion of each unit into the chain also remain constant throughout the polymerization.

In the particular case of the invention, the prediction of the microstructure is calculated by the following equations:

$$\% \ units_E = \frac{R_1 + R_3 + R_4 + R_6 - 2R_8 + R_9}{R_1 + R_2 + R_3 + R_4 + R_5 + R_6 + R_7 - 2R_8 + R_9}$$

$$\% \ units_B = \frac{R_2 + R_5 + R_7 - R_8}{R_1 + R_2 + R_3 + R_4 + R_5 + R_6 + R_7 - 2R_8 + R_9}$$

$$\% \ units_C = 1 - \% \ units_E - \% \ units_B$$

Where:
  $\% \ units_E$ is the molar percentage of the ethylene units in the chain
  $\% \ units_B$ is the molar percentage of the butadiene units (1,4 and 1,2) in the chain
  $\% \ units_C$ is the molar percentage of the cyclic units in the chain
  And R1 to R9 calculated as below $R1 = k_1 \% \ PE[E]$ $R2 = k_2 \% \ PE[B]$ $R3 = k_3 \% \ PB[E]$ $R4 = k_1 \% \ PBE[E]$ $R5 = k_2 \% \ PBE[B]$ $R6 = k_1 \% \ PBEE[E]$ $R7 = k_2 \% \ PBEE[B]$ $R8 = k_4 \% \ PBEE$ $R9 = k_5 \% \ PC[E]$ Where:
  $k_1$ to $k_5$ are constants
  [E], [B] are the concentrations of ethylene and butadiene in mol/l
  % PE, % PB, % PBE, % PBEE and % PC calculated according to the system of equations below:

$$\frac{\% \ PE}{\% \ PB} = \left( \frac{k_1^2 k_3 [E]^3}{k_2(k_1[E]+k_2[B]+k_4)(k_1[E]+k_2[B])[B]} + \frac{k_1 k_3 k_4 [E]^2}{k_2(k_1[E]+k_2[B]+k_4)(k_1[E]+k_2[B])[B]} \right)$$

$$\frac{\% \ PBE}{\% \ PB} = \frac{k_3[E]}{k_1[E]+k_2[B]}$$

$$\frac{\% \ PBEE}{\% \ PB} = \frac{k_1 k_3 [E]^2}{(k_1[E]+k_2[B]+k_4)(k_1[E]+k_2[B])}$$

$$\frac{\% \ PC}{\% \ PB} = \frac{k_1 k_3 k_4 [E]}{k_5(k_1[E]+k_2[B]+k_4)(k_1[E]+k_2[B])}$$

$$\% \ PB = \frac{1}{1 + \frac{\% \ PE}{\% \ PB} + \frac{\% \ PBE}{\% \ PB} + \frac{\% \ PBEE}{\% \ PB} + \frac{\% \ PC}{\% \ PB}}$$

Where the values of $k_2$, $k_3$, $k_4$ and $k_5$ are measured experimentally and then related to $k_1$.

The table below represents typical values of the values $k_2$, $k_3$, $k_4$ and $k_5$ related to $k_1$ for the catalytic systems that can be used in the polymerization process described in the invention.

TABLE 3

| | Example value | Minimum value | Maximum value |
|---|---|---|---|
| $k_1/k_1$ | 1.00 | | |
| $k_2/k_1$ | 1.60 | 1 | 5 |
| $k_3/k_1$ | 160.00 | 0.02 | 300 |
| $k_4/k_1$ | 0.80 | 0.1 | 2 |
| $k_5/k_1$ | 80.00 | 0.01 | 200 |

This mathematical model makes it possible to predict the distribution of the ethylene, butadiene and 1,2-cyclohexane units of an elastomer produced according to the invention as a function of the constants k1 to k5 and of the molar composition of ethylene and butadiene in the liquid phase. Using this model, it is predicted that, in terms of microstructure, the copolymer obtained by means of the continuous process according to the invention has the same microstructure as the copolymer obtained by means of the semi-continuous process of patent application FR15/62573 (unpublished), the relative concentrations used being identical in the two cases, whether the reactor pressure is 8.5 bar or 70 bar.

However, the continuous polymerization process is more productive per reactor unit volume, in comparison with the semi-continuous process of patent application FR15/62573 (unpublished). For the semi-continuous process, the simulated shutdown times range between 0.2 and 1.0 times the residence time (mrt) of the continuous reactor.

The productivity by volume is defined by the amount of copolymer formed (in kg) per volume of reactor (in m³) and residence time in the reactor (h).

The semi-continuous reactors have shutdown times with respect to the polymerization (loading time, discharge time, cleaning time).

The productivity is defined by the following equations:

$$Prod_{continuous\ process} = \frac{Act([M], T)mrt}{mw(C)};$$

$$Prod_{semi-continuous\ process} = \frac{Act([M], T)mrt}{mw(C)} \cdot \frac{mrt}{mrt + tm};$$

Where tm is the shutdown time of the semi-continuous reactor. This tm is always greater than 0 and usually at least 20 min.

The continuous process is always more productive than the semi-continuous process.

Example 4: Microstructure of the Copolymer Obtained by Means of the Process According to the Invention In this example, the effect of the monomer concentration on the microstructure of the copolymer obtained is evaluated for various temperatures.

The polymerization tests of the table above were carried out under the following conditions:
- Batch reactor of working volume: 5l, fed with butadiene and ethylene with QnE, QnB, QmE and QmB constant;
- Solvent: 1.5 kg of methyl cyclohexane
- Catalytic system: $1.4 \times 10^{-4}$ mol of metallocene and $3.1 \times 10^{-4}$ mol of co-catalyst
- Residence time: greater than 20 min (parameter of little importance for microstructure determination)
- % M=Monomer concentration defined by weight amount of butadiene and ethylene in the total reaction medium

TABLE 4

| T poly intended (° C.) | QnE/ (QnE + QnB) | % M | % PB1-2 | % PB1-4 | % PE | % Cycles |
|---|---|---|---|---|---|---|
| 90 | 81% | 6% | 12% | 7% | 74% | 8% |
| 100 | 80% | 6% | 8% | 7% | 77% | 9% |
| 120 | 80% | 5% | 6% | 6% | 79% | 8% |
| OUTSIDE THE INVENTION | | | | | | |
| 100 | 80% | 43% | 16% | 6% | 75% | 3% |
| 100 | 80% | 46% | 16% | 6% | 76% | 3% |

TABLE 4-continued

| T poly intended (° C.) | QnE/ (QnE + QnB) | % M | % PB1-2 | % PB1-4 | % PE | % Cycles |
|---|---|---|---|---|---|---|
| 120 | 80% | 17% | 12% | 7% | 76% | 5% |
| 120 | 80% | 38% | 14% | 6% | 77% | 3% |
| 120 | 80% | 43% | 14% | 6% | 77% | 3% |

PB1-2 1,2-units of butadiene
PB1-4 1,4-units, of trans or cis configuration, of butadiene
PE ethylene units
Cycles trans-1,2-cyclohexane units
The percentages of each of these units are molar percentages.

It is noted that the content of trans-1,2-cyclohexane units is greater in the copolymers obtained by the process according to the invention, is to say when the monomer concentration, % M, is less than 15%.

The invention claimed is:

1. A process for the synthesis of an ethylene/butadiene copolymer, wherein the process is continuous and comprises the following steps:
    a. feeding at least one stirred polymerization reactor with a mixture of ethylene, butadiene, hydrocarbon-based solvent and catalytic system allowing the formation of cyclic trans-1,2-cyclohexane units in the polymer chain with a mole ratio of ethylene to the sum of the ethylene and butadiene monomers, defined by QnE/(QnE+QnB), with QnE the molar flow rate of ethylene and QnB the molar flow rate of butadiene, ranging from 0.5 to 0.99; the concentration of ethylene and butadiene monomers in the polymerization reaction medium being less than 15% by weight relative to the total weight; the operating pressure of the reactor is greater than or equal to the saturated vapour pressure of the polymerization reaction medium; and the polymerization temperature is greater than 90° C.; and
    b. recovering the ethylene/butadiene copolymer, this copolymer comprising, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units.

2. A synthesis process according to claim 1, wherein the concentration of ethylene and butadiene monomers in the polymerization reaction medium is less than 10% by weight relative to the total weight.

3. A synthesis process according to claim 1, wherein the mole ratio of ethylene, (QnE/(QnE+QnB)), ranges from 0.70 to 0.99.

4. A synthesis process according to claim 1, wherein the ratio of flow rate by weight of monomers and of the mixture, defined by (QmE+QmB)/(Qm total), with QmE the flow rate by weight of ethylene, QmB the flow rate by weight of butadiene and Qm total the flow rate by weight of the mixture, ranges between 0.05 and 0.15.

5. A synthesis process according to claim 1, wherein the residence time per polymerization reactor is less than 120 min.

6. A synthesis process according to claim 1, wherein N reactors, where N ranges from 2 to less than 10, are mounted in series and
    the first reactor (reactor 1) is fed with ethylene, butadiene, solvent and catalytic system, the mole ratio of ethylene to the sum of the ethylene and butadiene monomers, defined by (QnE/(QnE+QnB) ranges from 0.5 to 0.99, and the ratio of the flow rate by weight of monomers and of the mixture, defined by (QmE+QmB)/(Qm total), with QmE the flow rate by weight of ethylene, QmB the flow rate by weight of butadiene and Qm total the flow rate by weight of the mixture, is less than 0.15, and the output thereof feeds the next reactor;

the final reactor (reactor N) is fed from the reactor which precedes it (reactor N−1), and the output thereof feeds the copolymer recovery step;

each reactor between the first and the last (when N is greater than 2) is fed by the output of the reactor which precedes it (reactor N−1) and the output thereof feeds the reactor which follows it (reactor N+1).

7. A synthesis process according to claim 6, wherein each reactor, after the first, is also fed with a make-up stream of ethylene and butadiene so that the monomer concentration is identical at each reactor inlet.

8. A synthesis process according to claim 1, wherein the at least one stirred polymerization reactor is a liquid single-phase reactor.

9. A synthesis process according to claim 8, wherein the operating pressure of the at least one stirred polymerization reactor is at least 5 bar greater than the saturated vapour pressure of the mixture fed to the at least one stirred polymerization reactor.

10. A synthesis process according to claim 1, wherein the at least one stirred polymerization reactor is a gas/liquid two-phase reactor and the operating pressure of the gas/liquid two-phase reactor is equal to the saturated vapour pressure of the mixture.

11. A synthesis process according to claim 1, wherein the hydrocarbon-based solvent is selected from $C_2$ to $C_{30}$ alkanes, branched $C_4$ to $C_{30}$ alkanes, cyclic $C_5$-$C_6$ alkanes, branched cyclic $C_6$-$C_{30}$ alkanes, $C_6$-$C_{30}$ aromatic solvents and mixtures of these products.

12. A synthesis process according to claim 1, wherein the catalytic system comprises at least two constituents, the constituents including a metallocene corresponding to formula (I):

$$[P(Cp^1)(Cp^2)Met](I)$$

with:
Met being a group comprising:
at least one scandium or yttrium atom or one atom of lanthanide, the atomic number of which ranges from 57 to 71,
at least one monovalent ligand, belonging to the halogen group or to the amide, alkyl or borohydride group,
optionally other constituents,
P being a group, based on at least one silicon or carbon atom, bridging the two groups $Cp^1$ and $Cp^2$ $Cp^1$ and $Cp^2$ are identical to or different from one another,
when $Cp^1$ and $Cp^2$ are identical to one another, they are selected from indenyls substituted in the 2 position or from substituted or unsubstituted fluorenyls,
when $Cp^1$ and $Cp^2$ are different from one another, $Cp^1$ is selected from substituted or unsubstituted fluorenyls and $Cp^2$ is selected from cyclopentadienyls substituted in the 2 and 5 positions, from indenyls substituted in the 2 position, or from substituted fluorenyls; and the constituents including a co-catalyst which is an alkyl magnesium, an alkyl lithium, an alkyl aluminium, a Grignard reagent or a mixture of these constituents.

13. A synthesis process according to claim 1, wherein the microstructure of the copolymer obtained is homogeneous and thus the molar concentration of each of the units is constant all along the copolymer chain.

14. A synthesis process according to claim 1, wherein, in the copolymer obtained, the molar fraction of ethylene units ranges from 50 mol % to 95 mol %, relative to the total number of moles of ethylene, butadiene and trans-1,2-cyclohexane units.

15. A synthesis process according to claim 1, wherein, in the copolymer obtained, the molar fraction of trans-1,2-cyclohexane units is greater than or equal to 4%, relative to the total number of moles of ethylene, butadiene and trans-1,2-cyclohexane units.

16. A synthesis process according to claim 1, wherein the copolymer obtained has a degree of crystallinity of less than 20%.

17. A synthesis process according to claim 12, wherein $Cp^1$ and $Cp^2$ are identical to one another and are indenyls substituted in the 2 position selected from 2-methylindene or 2-phenylindene, or are a substituted or unsubstituted fluorenyl selected from fluorenyl, 2,7-di-tert-butylfluorenyl or 3,6-di-tert-butylfluorenyl.

18. A synthesis process according to claim 12, wherein $Cp^1$ and $Cp^2$ are different from one another and wherein:
$Cp^1$ is selected from substituted or unsubstituted fluorenyls, selected from fluorenyl, 2,7-di-tert-butylfluorenyl, or 3,6-di-tert-butylfluorenyl
$Cp^2$ is a cyclopentadienyl substituted in the 2 and 5 positions, said cyclopentadienyl being tetramethylcyclopentadiene, or an indenyl substituted in the 2 position selected from 2-methylindene or 2-phenylindene, or a substituted fluorenyl selected from 2,7-di-tert-butylfluorenyl or 3,6-di-tert-butylfluorenyl.

* * * * *